US006386744B1

(12) United States Patent
Scholl

(10) Patent No.: US 6,386,744 B1

(45) Date of Patent: May 14, 2002

(54) HEADLIGHT FOR A VEHICLE WITH MEANS FOR REDUCING GLARE

(75) Inventor: Michael Scholl, Gomaringen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/670,725

(22) Filed: Sep. 27, 2000

(30) Foreign Application Priority Data

Sep. 28, 1999 (DE) ........................................ 199 46 351

(51) Int. Cl.[7] ............................ B60Q 1/00; F21M 3/14

(52) U.S. Cl. ....................... 362/518; 362/509; 362/351; 362/539

(58) Field of Search ................................ 362/351, 539, 362/510, 509, 517, 518

(56) References Cited

U.S. PATENT DOCUMENTS 5,971,575 A * 10/1999 Matubara .................... 362/510
6,170,970 B1 * 1/2001 Eto ............................ 362/351

FOREIGN PATENT DOCUMENTS

DE 197 44 998 A1 4/1999

* cited by examiner

*Primary Examiner*—Thomas M. Sember
(74) *Attorney, Agent, or Firm*—Michael J. Striker

(57) ABSTRACT

The headlight has a reflector (10) in which a light source (14) is mounted. A light ray stop (30 having a pot-shaped region (32) is associated with the light source (14) and arranged to block off a part of the light from the light source (14) so that it does not reach the reflector (10). The reflector (10) has a region (20), from which light is reflected so that it falls on the pot-shaped region (32). The pot-shaped region has openings (36) through which a portion of the light falling on this light ray stop (20) can pass into the pot-shaped region (32). Cover elements (38) are associated with these openings which prevent another part of the light from the light source in the pot-shaped region from passing out through the openings. They also reflect some of the light falling on the pot-shaped region near the openings through the openings and into the pot-shaped region. This device at least partially prevents light that falls on the pot-shaped region from being reflected as scattered light and forming an annoying glare.

13 Claims, 2 Drawing Sheets

HEADLIGHT FOR A VEHICLE WITH MEANS FOR REDUCING GLARE

BACKGROUND OF THE INVENTION

1. Field of the Invention

The present invention relates to a headlight for a vehicle, especially a motor vehicle, and, more particularly, to a headlight for a vehicle comprising a light source, a reflector by means of which light issuing from the light source is reflected and a light ray stop, which has a pot-shaped region, by which a part of the light from the light source is blocked off so that it does not reach the reflector.

2. Prior Art

This type of headlight is described in DE 197 44 998A1. This headlight has a light source, a reflector by which light issuing from the light source is reflected and a light ray stop or mask. The light ray stop has a sleeve-shaped region. A part of the light from the light source is block off by the sleeve-like portion so that it does not issue from the headlight. The light beam from the headlight must have a sufficient horizontal scattering in order to illuminate the region in front of the vehicle over a large width. It is desirable to obtain the horizontal scattering of the light already by means of the reflector, which is formed so that light from the light source is reflected by it with the required horizontal scattering. However a portion of the light reflected by the reflector to form the beam falls on the sleeve-shaped region of the light ray stop. Light falling on the sleeve-shaped region of the light ray stop is reflected by it and thus produces, under some circumstances, an undesirable scattered light and an annoying glare.

SUMMARY OF THE INVENTION

It is an object of the present invention to provide a headlight for a vehicle of the above-described type, which has a light ray stop with a pot-shaped region, but does not have the above-described disadvantages and does not produce an annoying glare from the light ray stop.

This object and others, which will be made more apparent hereinafter, are attained in a headlight for a vehicle comprising a light source, a reflector by which light issuing from the light source is reflected and a light ray stop, which has a pot-shaped region and which is arranged so that a part of the light from the light source is blocked off so that it does not reach the reflector.

According to the invention the pot-shaped region of the light ray stop has a wall or casing provided with a plurality of openings through which a portion of the light reflected by a reflector region near the peak portion of the reflector and failing on the pot-shaped region at least partially passes into the pot-shaped region of the light ray stop, i.e. into the interior of the light ray stop through the openings.

The headlight according to the invention has the advantage that a portion of the light reflected by the reflector onto the sleeve-shaped portion of the light ray stop is at least partially not reflected by it. Instead it at least partially passes into an interior region in the pot-shaped portion of the light ray stop and thus causes no undesirable light scattering and glare.

Preferred embodiments of the headlight of the present invention provide further advantages.

In a preferred embodiment of the headlight of the invention the pot-shaped region is provided with respective cover elements associated with corresponding openings in the wall of the light ray stop, which are formed and arranged so that another portion of the light propagated directly from the light source toward the openings is blocked by the cover elements and does not pass through the openings and issue from the light ray stop, and the portion of the light reflected from the reflector region near the reflector peak that is directed toward the light ray stop passes through the openings into the pot-shaped region.

In a particularly advantageous preferred embodiment the cover elements are at least partially reflective and arranged so that a further portion of the light reflected by the reflector that is propagated toward the pot-shaped region and toward the cover elements is at least partially reflected by the cover elements toward the openings and into the pot-shaped region. The features of this embodiment further reduce the undesirable scattered light that can cause troublesome glare.

Advantageously the cover elements are at least partially approximately planar, the openings are distributed circumferentially around the pot-shaped region and over a longitudinal extent of the pot-shaped region. The cover elements protrude out from the wall or casing of the pot-shaped region.

In a preferred embodiment of the invention the light ray stop has a pot-shaped portion made from a curved metal sheet, preferably formed into a hollow cylinder. Then openings in the wall or casing are provided by bending out sections of the curved metal sheet. The bent out sections of the curved metal sheet form the cover elements. This embodiment is particularly easy to manufacture.

In a particularly preferred embodiment of the headlight the pot-shaped region of the light ray stop has an interior surface at least partially provided with a light-absorbing and/or black coating.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
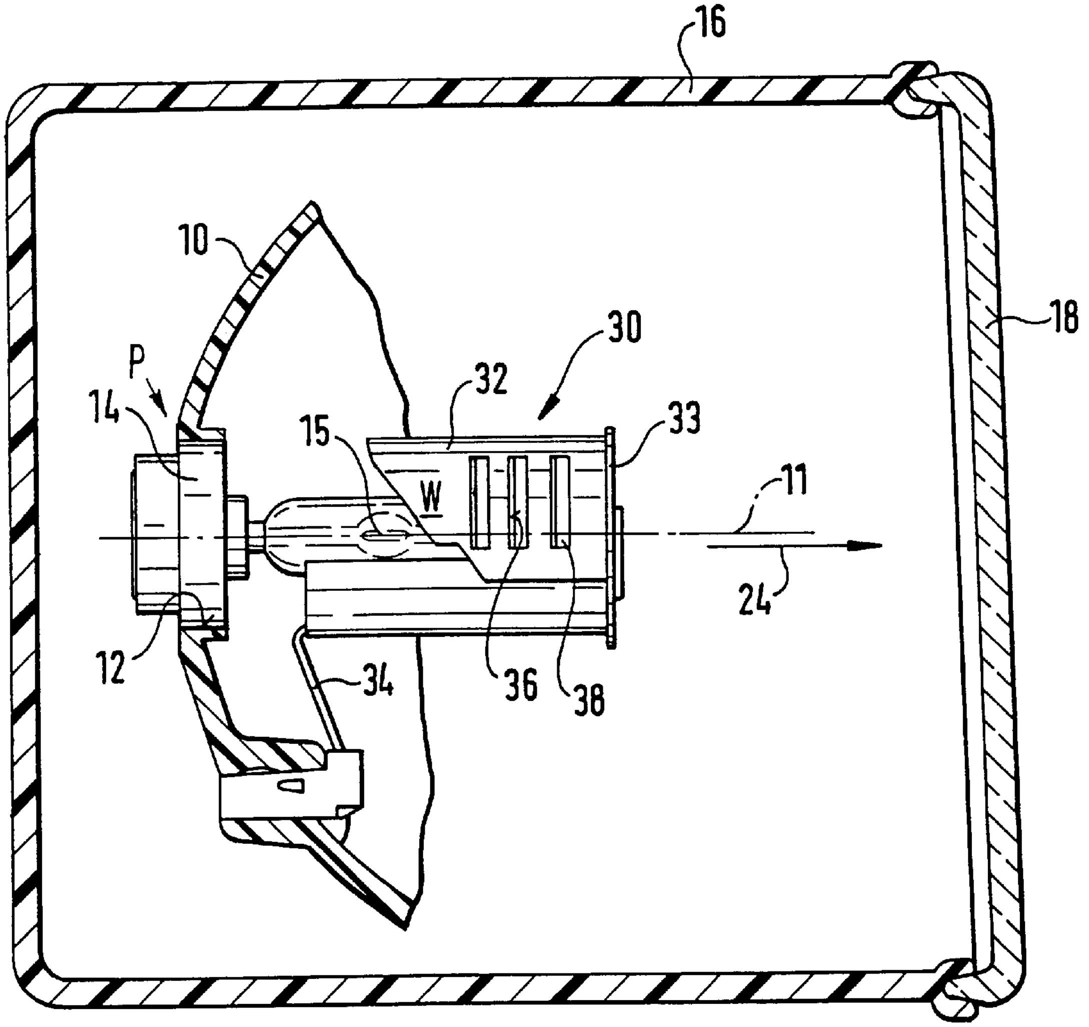
FIG. 1 is a vertical longitudinal cross-sectional view through a headlight according to the invention.
Figure 2:
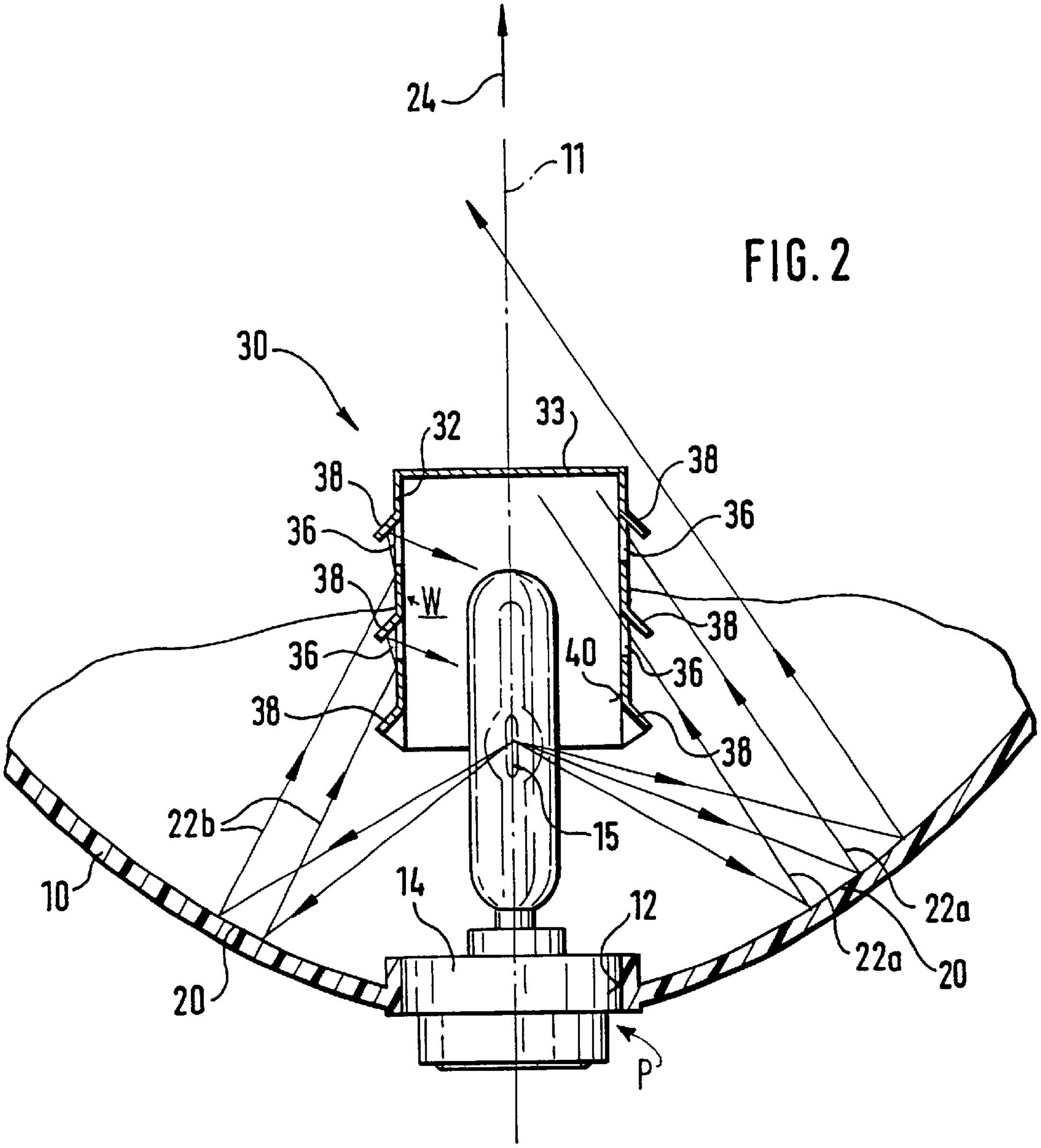
FIG. 2 is a detailed cutaway horizontal cross-sectional view through the headlight of FIG. 1.

A headlight for a vehicle, especially a motor vehicle, shown in FIGS. 1 and 2, is preferably a low beam headlight. If necessary the headlight can also produce high beam light or alternatively fog light. The headlight has a reflector 10, which has a concave shape and a reflective coating on its front side. The reflector 10 has a light source 14 mounted in an opening 12 provided in its peak region P. The light source can be an incandescent lamp or a gas discharge lamp. It has a radiating body 15 in the form of a filament or an arc that radiates visible light. The reflector 10 preferably is arranged in an adjustable or movable housing 16, whose light outlet opening is covered with a light permeable disk 18. The cover disk 18 is preferably at least partially smooth so that light passes through it essentially unchanged, without being influenced by it. Alternatively, the cover disk 18 has an optical profile, at least in one region or portion, by which light is deflected and/or scattered.

The form of the reflector 10 is preferably such that light propagated from the light source 14 is reflected as a light beam which produces an appropriate illumination intensity distribution for the respective application. The light beam must have sufficient scattering in the horizontal direction, among other requirements. The reflector 10 is shaped in a region 20 near its peak P, especially as seen in the horizontal longitudinal section shown in FIG. 2, so that light directed toward it from the light source 14 is reflected as a convergent light beam in a horizontal longitudinal plane. The light rays 22 of the light beam travel to the optic axis 11 of the reflector in a direction so as to be inclined to the optic axis 11 and to intersect or cross it. A sufficient horizontal scattering of the light propagated from the headlight is attained by this convergence of the light rays 22, without requiring an optical profile in any portion of the cover disk 18.

The headlight has a light ray stop 30, which blocks light propagated directly in the light outlet direction 24 from the light source, so that this portion of the light does not cause glare. The light ray stop 30 has a pot-shaped region 32 and at least one foot 34 connected to it or in one piece with it, which for example is attached to the reflector 10. The pot-shaped region 32 of the light ray stop 30 extends over an end region of the light source 14 pointing in the light outlet direction 24. The base 33 of the pot-shaped region 32 is arranged in front of the light source 14 in the light outlet direction 24. A wall W or casing region extends from the base 33 in a direction opposite to the light outlet direction 24 over a portion of the longitudinal extent of the light source 14, for example approximately up to its radiating body 15. The pot-shaped region 32 extends also at least over a portion of the periphery or circumference of the light source 14 and is shaped like a hollow cylinder, for example with a circular cross-section, but which, of course, is closed by the base 33 at one end. The pot-shaped region 32 of the light ray stop 30 blocks a portion of the light issuing from the light source 14 toward the reflector 10 in addition to another portion of the light issuing directly in the light outlet direction 24 from the light source 14, so that undesirable light reflection can be prevented. Furthermore, the pot-shaped region 32 blocks part of the light propagated from the light source 14, whereby a light-dark boundary of the light beam propagated from the headlight is produced.

As clearly shown from FIGS. 1 and 2, light rays 22 reflected by the region 20 of the reflector 10 near its peak are propagated toward the pot-shaped region 32 of the light ray stop 30. The pot-shaped region 32 has a plurality of openings 36 in its casing or wall W, which are, for example, slot-shaped. The openings 36 are distributed around the circumference of the casing or wall W of the pot-shaped region and along the longitudinal extent of the casing or wall W. The openings 36 are, especially, provided in the lateral or side region of the casing or wall of the pot-shaped region 32. In the upper and lower region of the casing or wall W of the pot-shaped region 32 no openings are provided. Light rays 22*a* reflected by the region 20 of the reflector 10 near its peak portion and directly toward the openings 36 pass through the openings 36 into the pot-shaped portion 32 and thus are not reflected by the outer surface of the pot-shaped portion or region 32.

Preferably respective cover elements 38 are associated with corresponding openings 36. The cover elements 38 are arranged and formed, so that light propagated directly from the light source 14 toward the openings 36 is blocked by the cover elements. However light rays 22*a* reflected from the region 20 of the reflector pass through the openings 36 and enter an interior region provided in the light ray stop. For example, the cover elements 38 are arranged at the respective edges of the openings 36 furthest from the reflector in the light outlet direction 24 and are bent out from these edges or are inclined in relation to the optic axis 11. The cover elements 38 project from the outer surface of the pot-shaped region 32 toward the outside. The cover elements 38 preferably extend at least approximately parallel to the light rays 22*a* from the reflector region 20, so that the openings 36 for the light rays are not reduced in size by the cover elements 38. The cover elements 38 are for example at least approximately planar. The pot-shaped region 32 of the light ray stop 30 preferably is formed from a curved metal sheet. Sections of the metal sheet are cut open and bent outward to form the openings 36 and also the cover elements 38 in a simple manner.

The cover elements 38 are preferably at least partially reflective. In this way light rays 22*b* reflected from the reflector region 20 which fall on the outer casing or wall of the pot-shaped region 32 between the openings 36 are reflected there so that they are directed toward the cover elements 38 and there are reflected into the pot-shaped region 32. A further reduction of the light propagated from the headlight and reflected by the outer surface of the pot-shaped region can thus be provided by forming the cover elements 38 in this manner.

The pot-shaped region 32 of the light ray stop 30 is provided with a black and/or light-absorbing coating 40 on at least a portion of an interior surface facing the light source 14. Light reflection of the light passing through the openings 36 on the inner surface of the pot-shaped portion 32 is prevented, or at least weakened, and a strong heating of the pot-shaped region is avoided. Also reflection of the light propagated directly to the inner surface of the pot-shaped region 32 from the light source 14 is reduced.

Because of the reduced light-reflection at the pot-shaped region 32 of the light ray stop 30, it should not be constructed with as small dimensions as possible to avoid undesirable glare. Instead its dimension should be selected to optimize blocking of the required portion of light propagated by the light source The disclosure in German Patent Application 199 46 351.4 of Sep. 28, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a headlight for a vehicle with means for reducing glare, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A headlight for a vehicle, said headlight comprising a light source (14), a reflector (10) for reflecting light generated by the light source (14) and a light ray stop (30), said light ray stop (30) having a pot-shaped region (32), said pot-shaped region (32) having a circumference and being formed and arranged to block off a part of the light produced by the light source (14) so that said part of said light does not reach the reflector (10), wherein said pot-shaped region (32) of the light ray stop has a wall (W) provided with a plurality of openings (36) through which a portion of the light reflected by a reflector region (20) of the reflector (10) near a peak portion (P) of the reflector and falling on the pot-shaped region (32) at least partially passes through the openings (36) into the pot-shaped region (32) of the light ray stop, and wherein the pot-shaped region (32) has respective cover elements (38) associated with said openings (36) arranged so that another part of the light propagated directly from the light source (14) to said openings (36) is blocked off by said cover elements (38) and does not pass out from said pot-shaped region (32) through said openings (36), and so that said portion of said light reflected from said reflector region (20) of said reflector passes through the openings (36) into the pot-shaped region (32).

2. The headlight as defined in claim 1, wherein said cover elements (38) are at least partially reflective and arranged so that an additional part of the light reflected by the reflector region (20) that is propagated toward the pot-shaped region (32) and said cover elements (38) is at least partially reflected by said cover elements (38) and directed toward said openings (36) so as to pass through said openings (36) into said pot-shaped region (32).

3. The headlight as defined in claim 1 or 2, wherein the cover elements (38) are at least approximately planar.

4. The headlight as defined in claim 1, wherein the openings (36) are circumferentially distributed around said pot-shaped region (32).

5. The headlight as defined in claim 1, wherein the openings (36) are distributed over a longitudinal extent of the pot-shaped region (32).

6. The headlight as defined in claim 1, wherein said cover elements (38) protrude out from an outer surface of the pot-shaped region (32).

7. The headlight as defined in claim 1, wherein the pot-shaped region (32) of the light ray stop (30) comprises a curved metal sheet in the form of a hollow cylinder and the respective cover elements (38) are bent-out portions of said curved metal sheet that extend from the pot-shaped region (32) adjacent to said openings (36).

8. The headlight as defined in claim 1, wherein said pot-shaped region (32) of the light ray stop (30) has an interior surface at least partially coated with a light-absorbing coating.

9. The headlight as defined in claim 8, wherein said light-absorbing coating is black.

10. The headlight as defined in claim 1, wherein said pot-shaped region (32) of the light ray stop (30) has an interior surface that is at least partially covered with a black coating.

11. The headlight as defined in claim 1, wherein the pot-shaped region (32) of the light ray stop (30) extends over an end region of the light source (14) pointing in a light outlet direction (24), the end region of the pot-shaped region (32) is closed by a base (33) of the pot-shaped region (32) and the wall (W) extends from the base (33) in a direction opposite to the light outlet direction (24) over a portion of the longitudinal extent of the light source (14).

12. The headlight as defined in claim 11, wherein the light source (14) has a radiating body (15) and the wall (W) extends from the base (33) up to the radiating body (15).

13. The headlight as defined in claim 11, wherein said pot-shaped region (32) extends circumferentially around at least a portion of the light source (14) and has a circular transverse cross-section.

* * * * *